US012463501B2

(12) United States Patent
Pascal et al.

(10) Patent No.: US 12,463,501 B2
(45) Date of Patent: Nov. 4, 2025

(54) WHEEL WITH EDDY CURRENT MAGNETIC BRAKING DEVICE AND AIRCRAFT LANDING GEAR PROVIDED WITH SUCH A WHEEL

(71) Applicant: SAFRAN LANDING SYSTEMS, Velizy-Villacoublay (FR)

(72) Inventors: Vincent Pascal, Moissy-Cramayel (FR); Yannick Senechal, Moissy-Cramayel (FR); Graeme Klim, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 190 days.

(21) Appl. No.: 18/565,269

(22) PCT Filed: May 25, 2022

(86) PCT No.: PCT/EP2022/064338
§ 371 (c)(1),
(2) Date: Nov. 29, 2023

(87) PCT Pub. No.: WO2022/253690
PCT Pub. Date: Dec. 8, 2022

(65) Prior Publication Data
US 2024/0262212 A1    Aug. 8, 2024

(30) Foreign Application Priority Data
May 31, 2021   (FR) ...................................... 2105729

(51) Int. Cl.
*H02K 7/104*   (2006.01)
*H02K 7/106*   (2006.01)
(Continued)

(52) U.S. Cl.
CPC ............. *H02K 7/104* (2013.01); *H02K 7/106* (2013.01); *B60L 7/28* (2013.01); *B60L 2200/10* (2013.01); *B64C 25/42* (2013.01)

(58) Field of Classification Search
CPC ...... H02K 7/104; H02K 7/102; H02K 7/1021; H02K 7/1028; H02K 7/106; H02K 7/112;
(Continued)

(56) References Cited

U.S. PATENT DOCUMENTS 5,064,029 A * 11/1991 Araki ................... H02K 49/043
188/164
8,201,774 B2 * 6/2012 Gieras .................... H02K 49/06
188/161

(Continued)

FOREIGN PATENT DOCUMENTS

| CN | 206585444 U | 10/2017 |
|---|---|---|
| WO | 2014/029962 A1 | 2/2014 |
| WO | 2019/204455 A1 | 10/2019 |

OTHER PUBLICATIONS

International Search Report for PCT/EP2022/064338 dated Aug. 9, 2022.

*Primary Examiner* — Alexander A Singh
(74) *Attorney, Agent, or Firm* — Sughrue Mion, PLLC (57) ABSTRACT

A wheel including a rim that rotates on a shaft defining a primary rotational axis and a magnetic braking device. The magnetic braking device includes an actuator which includes a first transmission assembly and one second transmission assembly each includes a pinion mounted on the support to pivot about a secondary rotational axis parallel to the primary axis, an operating bar extending about the secondary axis, a first mechanical connecting member connecting the operating bar to the pinion of the transmission assembly and a second mechanical connecting member connecting the operating bar to one of the stators, and the mechanical
(Continued)

connecting members are arranged. The rotation of the pinions causes a movement of the stators parallel to the secondary axis in opposite directions, for varying the air gap, one or more of the mechanical connecting members of each transmission assembly being arranged to ensure a screw-nut helical connection.

15 Claims, 10 Drawing Sheets

(51) Int. Cl.
  *B60L 7/28* (2006.01)
  *B64C 25/42* (2006.01)
(58) Field of Classification Search
  CPC ........ H02K 7/1125; H02K 7/12; B64C 25/44;
      B64C 25/42; B60L 17/28; B60L 2200/10;
          F16D 65/186; F16D 63/002; F16D
          2121/20; B60T 8/325; B60T 13/748
  USPC ......................................... 310/76, 77, 92, 93
  See application file for complete search history.

(56) References Cited

U.S. PATENT DOCUMENTS

2015/0300432 A1\* 10/2015 Yamaguchi .......... H02K 49/043
                                                                188/71.6
2020/0300310 A1    9/2020 Kostic \* cited by examiner

WHEEL WITH EDDY CURRENT MAGNETIC BRAKING DEVICE AND AIRCRAFT LANDING GEAR PROVIDED WITH SUCH A WHEEL

CROSS REFERENCE TO RELATED APPLICATIONS

This application is a National Stage of International Application No. PCT/EP2022/064338 filed May 25, 2022, claiming priority based on French Patent Application No. 2105729 filed May 31, 2021, the contents of each of which being herein incorporated by reference in their entireties.

The present invention relates to the field of the braking of vehicle wheels, such as aircraft wheels.

BACKGROUND OF THE INVENTION

An aircraft wheel generally comprises a rim connected by a web to a hub mounted to rotate on a wheel support shaft (axle or spindle) integral with an end of a landing gear.

Friction braking devices are known, comprising a brake disc stack which is housed in a space extending between the rim and the hub and which comprises alternating rotor discs rotatably linked with the wheel and stator discs, stationary with respect to the wheel support. The braking device also comprises hydraulic or electromechanical actuators mounted on an actuator carrier and arranged to apply a controlled braking force on the stack of discs, so as to block the rotation of the wheel.

It has been proposed, in particular in document FR-A2953196, to provide such braked wheels with an electromagnetic auxiliary brake ensuring an energy dissipation by means other than mechanical friction.

Eddy current magnetic braking devices are further known, used for the braking of vehicle wheels, and more specifically, aircraft wheels. Document WO-A-2014/029962 describes such a device comprising a stator which is provided with one or more magnets, and which is mounted opposite an electrically conductive rotor.

Document US-A-20200300310 itself also describes an eddy current magnetic braking device.

Generally, the performance of an eddy current magnetic braking device depends on the power of the magnets used and on their dimensions. The braking device is therefore relatively heavy and bulky when the maximum braking power required is significant. Such is the case, for example, of a use on an aeroplane, even though the mass and the bulk are severe constraints for this use.

Furthermore, to actuate the magnetic braking devices, it is known to move the stators with respect to the rotors. However, the free space at the wheel is extremely reduced, such that the installation of actuators is difficult there, which is even truer, if the number of rotors and/or stators increases.

OBJECT OF THE INVENTION

The invention aims, in particular, to propose an eddy current magnetic braking device, at least partially overcoming the abovementioned disadvantages.

SUMMARY OF THE INVENTION

To this end, a wheel is provided, according to the invention, comprising a rim mounted to rotate on a support comprising a shaft defining a primary rotational axis, and an eddy current magnetic current braking device, comprising at least one first braking set comprising a first stator and a second stator which are linked to the support and a rotor linked to the rim and disposed between the stators, such that each stator has a first face opposite a face of the rotor and separated from said face by an air gap, the rotor being made of electrically conductive material, and the stators carrying a plurality of magnets, emitting via the first face, a magnetic flux capable of causing, according to the air gap, eddy currents in the rotor when the rotor pivots with the wheel. The device comprises an actuator which comprises at least one first transmission assembly and one second transmission assembly, each comprising a pinion mounted on the support to pivot about a secondary rotational axis parallel to the primary axis, an operating bar extending about the secondary axis, a first member for mechanically connecting the operating bar to the pinion and at least one second member for mechanically connecting the operating bar to one of the stators. The mechanical connecting members are arranged, such that the rotation of the pinions causes the stators to move parallel to the secondary axis in opposite directions to vary the air gap, at least one of the mechanical connecting members of each transmission assembly being arranged to ensure a screw-nut helical connection.

This arrangement makes it possible to optimise and to concentrate a magnetic flux, and therefore to cause an excess eddy current, thus providing a relatively high braking torque, greater than that which would be obtained with two assemblies constituted of a stator and of a rotor. The structure of the actuator of the invention is particularly advantageous, as the actuation of such an arrangement with conventional actuators would give the magnetic braking device a volume and a mass greater than those obtained by using the actuator of the invention.

According to an embodiment, the first transmission assembly is linked to the first stator and the second transmission assembly is linked to the second stator. The operating bar of each transmission assembly is mounted on the support to be rotatably stationary and to slide about the secondary axis. The first mechanical connecting member ensures the helical connection and the second mechanical connecting member is arranged to connect the operating bar and the stator in question in translation about the secondary axis, such that the rotation of the pinion of each transmission assembly causes the translation of the operating bar and of the stator in question about the secondary axis, the helical connection of the first transmission assembly and the helical connection of the second transmission assembly having opposite directions.

According to another embodiment, the operating bars are mounted on the support to be stationary in translation and rotatably free about the secondary axis. The first mechanical connecting member is arranged to rotatably link the pinion and the operating bar of the transmission assembly in question and the second mechanical connecting member of each operating bar of each transmission assembly ensures the helical connection with the stator, such that the rotation of the pinion and of the operating bar of each transmission assembly causes a translation of the stator about the secondary axis, the helical connection of the first stator and the helical connection of the second stator having opposite directions.

The invention also relates to a landing gear and an aircraft provided with at least one such wheel.

Other features and advantages of the invention will emerge upon reading the following description of particular and non-limiting embodiments of the invention.

BRIEF DESCRIPTION OF THE DRAWINGS

Reference is made to the accompanying drawings, among which.

DETAILED DESCRIPTION OF THE INVENTION

In reference to FIGS. 1 to 5, the first embodiment of the invention is described in application to an aircraft 100 comprising landing gears 101. Each landing gear 101 comprises a strut having an end provided with two coaxial shafts 102 on each of which a wheel 103 is mounted to pivot. Each wheel 103 comprises, in a manner known per se, a hub 104 mounted to pivot on the shaft 102 and a rim 105 connected to the hub 104 by a web 106. The shafts 102 define a primary rotational axis 107 of the wheel 103.

According to the invention, the wheels 103 are each provided with a magnetic braking device.

The magnetic braking device comprises rotatably movable elements, or rotors 1, and rotatably stationary elements, or stators 2.

More specifically, in this case, the stators 2 and the rotors 1 are disc-shaped, coaxial to the wheel 103, therefore having central axes combined with the primary rotational axis 107. The stators 2 and the rotors 1 are arranged in two triplets, each forming a braking set I, II. Each braking set I, II comprises a rotor 1 disposed between two stators 2a, 2b, each having a main face 2.1 extending opposite one of the main faces 1.1, 1.2 of the rotor 1. The faces 1.1, 1.2, 2.1 are parallel to one another. In the figures, the characters a, b have been added to distinguish the stator located opposite the face 1.1 and the stator located opposite the face 1.2. Each set I, II therefore comprises a rotor 1, a stator 2a and a stator 2b. In the description, these characters a, b are used, only when it is necessary to distinguish the stators 2 from one another.

The stators 2 are rotatably connected to the shaft 102 or to the strut of the landing gear 101, in this case, by way of a torque tube 3 (or torque tube) integral with an actuator carrier plate 7, rigidly fixed to the shaft 102, while the rotors 1 are rotatably connected to the wheel 103, in this case to the rim 105 of the wheel 103, in a manner known per se. Thus, in each set I, II, each rotor 1 rotates on itself about its central axis with respect to the stators 2a, 2b which flank it: during this movement of the rotor 1 in a circumferential direction, the main faces 1.1, 1.2 remain opposite the main faces 2.1, parallel to these and separated by an air gap e. The stators 2a are located opposite the face 1.1 of the rotor 1 oriented towards the actuator carrier plate 7; the stators 2b are located opposite the face 1.2 of the rotor 1 oriented opposite towards the web of the wheel 103.

The torque tube 3 is provided with ridges to form sliders enabling each of the stators 2 to slide without rotation over the torque tube 3, such that each stator 2 is movable in an axial direction of the torque tube 3 between a first position, wherein the rotor 1 and the stator 2 are moved closer to one another and have their main faces 1.1, 1.2, 2.1 separated by a predetermined first air gap value and a second position, wherein the rotor 1 and the stator 2 are spaced apart from one another and have their main faces 1.1, 1.2, 2.1 separated by a predetermined second air gap value greater than the predetermined first air gap value.

The braking device comprises an actuator, generally referenced as 4, controllable by the pilot of the aeroplane in a manner known per se, to move the stators 2 between the two abovementioned positions. An axial abutment is provided, of the bearing abutment or needle abutment type, interposed between the rotors 1 and the stators 2 (or between the parts connected to these) to ensure that the stators 2 cannot be moved closer to the rotors 1 beyond the predetermined first air gap value.

The actuator 4 comprises a plurality of transmission assemblies generally referenced as 4a to move the stators 2a and a plurality of transmission assemblies, generally referenced as 4b to move the stators 2b. The transmission assemblies 4a are disposed alternately with respect to the transmission assemblies 4b.

Each transmission assembly 4a comprises an operating bar 5a mounted on the torque tube 3 to extend parallel to the primary rotational axis 107 and slide without rotation about said axis.

The operating bar 5a is connected by a first member 21a for mechanically connecting to a pinion 6a mounted in the actuator carrier plate 7 by bearings to be stationary in translation and rotatably movable about a secondary rotational axis 6a' colinear to the longitudinal axis of the operating bar 5a. The first mechanical connecting member 21a comprises a mesh made on the end of the operating bar 5a and a tapping made in the pinion 6a and receiving the end of the operating bar 5a, such that a rotation of the pinion 6a causes a translation of the operating bar 5a in one direction or in the other, in the direction of rotation of the pinion 6a. The pinions 6a mesh with an internal gearing of a crown 8 which is centred on the primary rotational axis 107 and which surrounds the pinions 6a. The crown 8 is held in its centred position by rollers mounted to pivot on the actuator carrier plate 7 about axes parallel to the primary rotational axis 107 and in contact with an external perimeter of the crown 8. The crown 8 is rotated by a driving pinion 9 mounted to pivot on the actuator carrier plate 7 about an axis parallel to the primary rotational axis 107. The means for rotating the driving pinion are not represented, but can be of any type (meshing, belt, chain, rack, etc.).

The operating bar 5a is connected by a second mechanical connecting member 22a to each stator 2a. Each second mechanical connecting member 22a comprises two collars extending radially projecting from the operating bar 5a to receive, between them, a portion of the internal circumference of one of the stators 2a and form abutments for driving the stators 2a between their two axial positions.

Each transmission assembly 4b comprises an operating bar 5b mounted on the torque tube 3 to extend parallel to the primary rotational axis 107 and slide without rotation about said axis.

The operating bar 5b is connected by a first mechanical connecting member 21b to a pinion 6b mounted in the actuator carrier plate 7 by bearings to be stationary in translation and rotatably movable about a secondary rotational axis 6b' colinear to the longitudinal axis of the operating bar 5b. The first mechanical connecting member comprises a mesh made on the end of the operating bar 5b and a tapping made in the pinion 6b and receiving the end of the operating bar 5a, such that a rotation of the pinion 6b causes a translation of the operating bar in one direction or in the other, in the direction of rotation of the pinion 6b. The pinions 6b mesh with the internal gearing of the crown 8.

The operating bar 5b is connected by a second mechanical connecting member to each stator 2b. Each second mechanical connecting member comprises two collars 20b extending radially projecting from the operating bar 5b to receive between them, a portion of the internal circumference of one of the stators 2b and form abutments for driving the stators 2b between their two axial positions.

The helical connection formed between the pinions 6b and the operating bars 5b is of direction opposite the helical connection formed between the pinions 6a and the operating bars 5a. It is therefore understood that, when the crown 8 rotates in a direction, it drives the pinions 6a, 6b in the same direction; however, the operating bars 5a are moved in a direction opposite the direction of movement of the operating bars 5b. A rotation of the crown 8 in a first direction therefore causes the stators 2a to move closer to the stators 2b (the air gap e with the rotors 1 decreases), while a rotation of the crown 8 in a second direction causes an extension of the stators 2a with the stators 2b respectively (the air gap e with the rotors 1 increases).

The rotors 3 are made of copper or of any other electrically conductive material.

Figure 12:
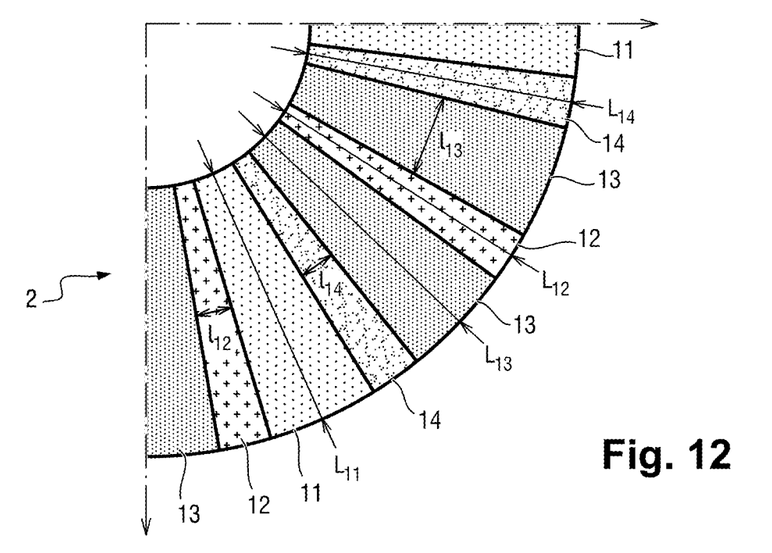
FIG. 12 is a partial schematic view of a stator of a braking device according to a first embodiment of a stator of the invention.
Figure 13:
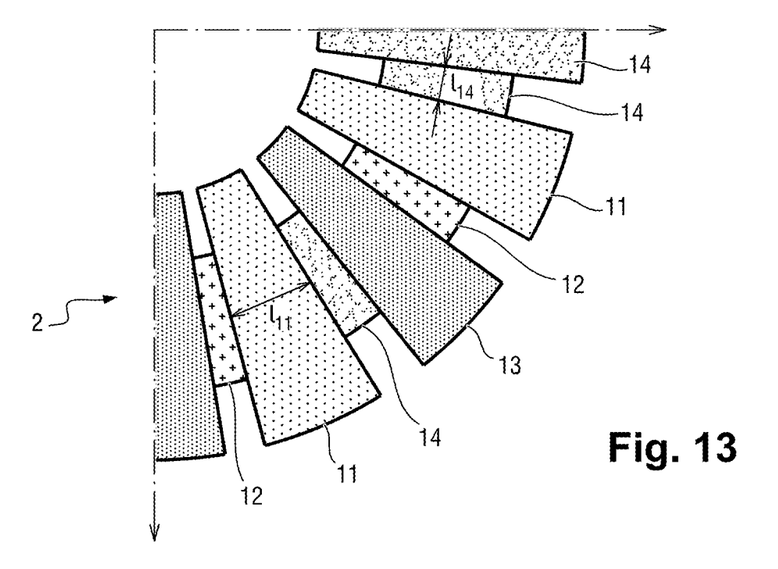
FIG. 13 is a partial schematic view of a stator of a braking device according to a second embodiment of a stator of the invention.
Figure 14:
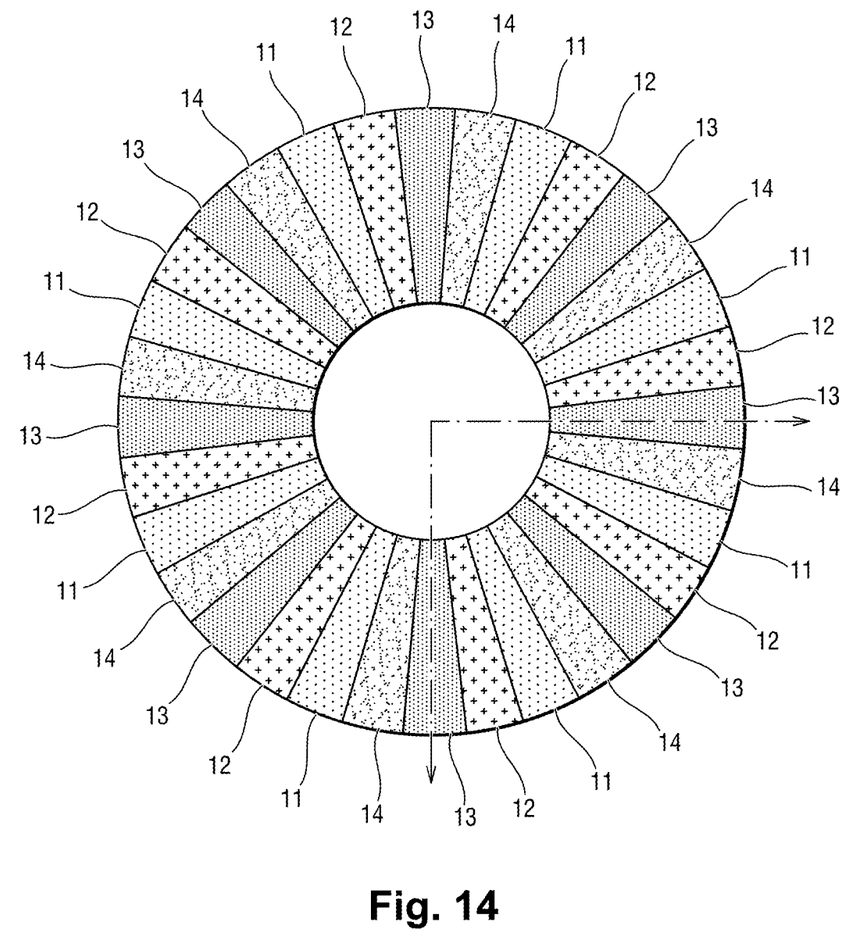
FIG. 14 is a partial schematic view of a stator of a braking device according to a third embodiment of a stator of the invention.

In reference to FIGS. 12, 13 and 14 also, each stator 2 of each triplet comprises a plurality of magnets capable of causing eddy currents in the rotor 1 when the stator 2 is in the first position, and the rotor 3 pivots facing the stator 2. There are, for example 16 magnets, in this case, rare earth-based, and are preferably fixed to a magnetic steel support, even to a non-magnetic support.

The plurality of magnets comprises first magnets 11, 13 that has a first magnetisation vector substantially perpendicular to the main face 2.1 and being separated in pairs by a second magnet 12, 14 that has a second magnetisation vector substantially perpendicular to the first magnetisation vectors of the two first magnets 11, 13 between which the second magnet 12, 14 is located. It is reminded that the magnetisation vector indicates the direction of the magnetic field caused by a magnet and extends into the magnet from the South pole to the North pole. More specifically, the magnets 11, 12, 13, 14 have angular sector shapes, and have a length L measured in a radial direction of the stator 2 and an average width l measured in a locally tangential direction of the discs (i.e. perpendicularly to the direction of the length L), at half said length L. The lengths L and widths 1 are measured in directions locally parallel to the opposite surfaces (the main faces 1.1, 1.2, 2.1).

The magnets 11, 12, 13, 14 are disposed according to a Halbach array, alternately in the circumferential direction of the stator 2 as follows: a magnet 11, a magnet 12, a magnet 13, a magnet 14, a magnet 11, a magnet 12, a magnet 13, a magnet 14 and so on. In this case:

each magnet 11 has its magnetisation vector which exits from the main face 2.1 (its North pole opens onto the main face 2.1), each magnet 12 has its magnetisation vector which extends from the neighbouring magnet 11 to the neighbouring magnet 13, each magnet 13 has its magnetisation vector which returns into the main face 2.1 (its South pole opens onto the main face 2.1), each magnet 14 has its magnetisation vector which extends from the neighbouring magnet 11 to the neighbouring magnet 13.

It is understood that the magnets 12, 14 disposed on each side of one same magnet 11 have their magnetisation vector oriented in opposite directions.

In each triplet, each magnet 11 of one of the two stators 2 faces a magnet 13 of the other of the two stators 2, and conversely, such that all the magnets 11 face magnets 13 and are mutually attracted through the rotor 3, which improves the performance.

According to an advantageous version of the invention, the magnets 11, 12, 13, 14 have widths $l_{11}, l_{12}, l_{13}, l_{14}$ such that the first magnets 11, 13 are spaced apart in pairs by a first distance (equal to the width $l_{12}, l_{14}$) less than a second distance (equal to the width $l_{11}, l_{13}$) separating, in pairs, the two magnets 12, 14. The best results are obtained when the width $l_{12}, l_{14}$ of the second magnets 12, 14 is 70% around those—$l_{11}, l_{13}$—of the first magnets 11, 13.

In reference to FIG. 12, the lengths $L_{11}, L_{12}, L_{13}, L_{14}$ of the magnets 11, 12, 13, 14 are identical to one another.

In reference to FIG. 13, the lengths $L_{11}, L_{13}$ of the magnets 11, 13 are identical to one another, and the lengths $L_{12}, L_{14}$ of the magnets 12, 14 are identical to one another. The lengths $L_1, L_{13}$ of the magnets 11, 13 are greater than the lengths $L_1, L_{14}$ of the magnets 12, 14. Preferably, the length $L_{12}, L_{14}$ of the second magnets 12, 14 is 70% around those—$L_1, L_{13}$—of the first magnets 11, 13.

In the arrangement represented in FIG. 13, the magnets 12, 14 are positioned symmetrically over a circle passing through the geometric centre of the North poles of the magnets 11 and South poles of the magnets 13.

It is understood that, in the two embodiments, the magnets 12, 14 occupy, on the main face 2.1, a surface smaller than that of the magnets 11, 13.

The arrangement of the magnets 11, 12, 13, 14 makes it possible to optimise and to concentrate the magnetic flux produced by the magnets 11, 13 by reducing the return path of the magnetic flux which passes through the magnets 12, 14, and not through their support, the mass of which can be reduced, since there is no need to ensure a conduction function of the magnetic flux.

The two embodiments above both make it possible to increase the braking torque provided, while limiting the mass and the bulk of the device.

The first embodiment enables a braking torque greater than the second embodiment, but has, however, a greater weight.

Each rotor 1 has a thickness, such that a skin effect (otherwise called pellicular effect or Kelvin effect) is caused from each face 1.1 of the rotor 1 over more than half the thickness of the rotor 1 at least over a range of possible relative speeds of the rotor 1 with respect to the stators 2. The eddy currents caused from the two faces 1.1 will thus circulate in the central part of each rotor 1, which will increase the braking torque. Thus, a "superposition of the skin effects" is obtained, the thickness of the rotor 1 being sufficiently low to obtain this effect, while satisfying the thermal and mechanical stresses. In an example, this effect gives around 60% of performance in addition.

It is understood that to cause the braking, the control actuator is controlled to bring the stators 2 into the first position, and that, to interrupt the braking, the control actuator is controlled to bring the stators 2 into the second position, position in which the magnets do not make it possible to cause sufficient eddy currents in the rotors to cause the braking of the rotors. It will be noted that below a certain rotation speed of the rotors 1, the braking torque is insignificant, whatever the position of the stators. An additional brake must thus possibly be considered.

Figure 1:
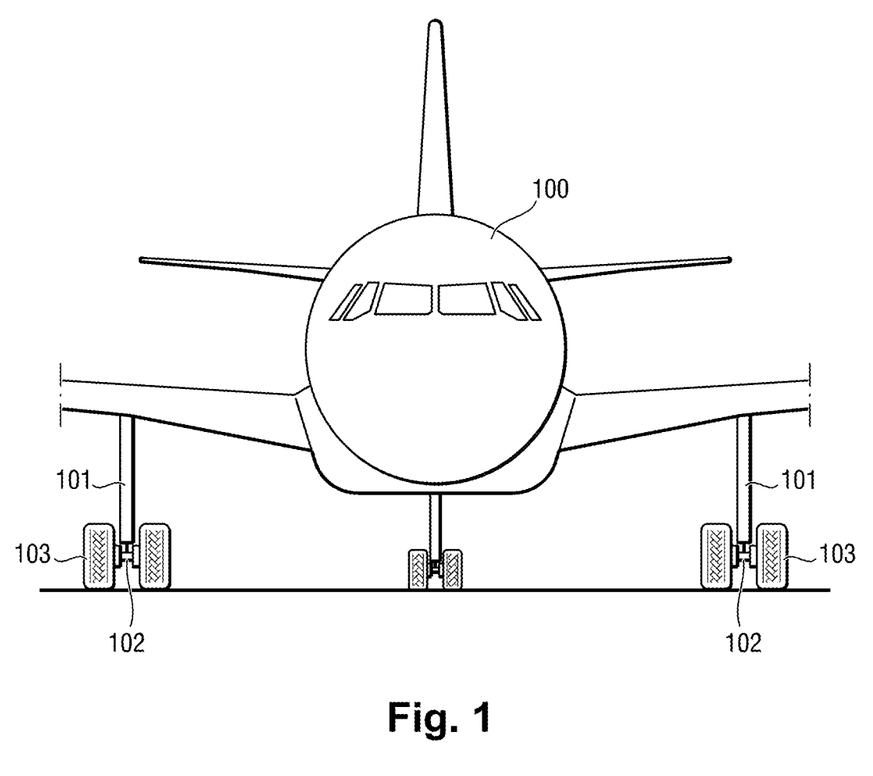
FIG. 1 is a partial schematic view of an aircraft provided with a landing gear according to the invention.
Figure 2:
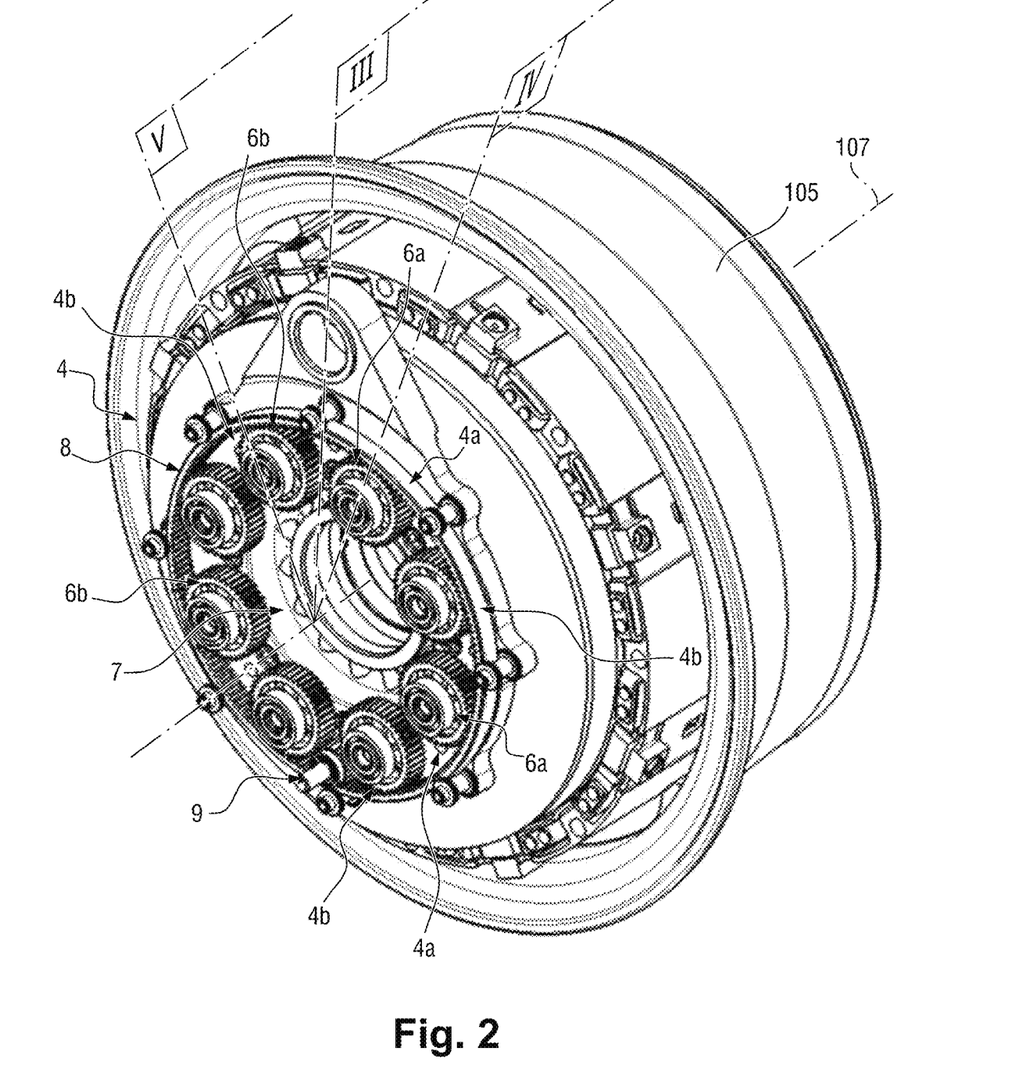
FIG. 2 is a perspective view of a wheel according to the invention, the wheel having no tyre.
Figure 3:
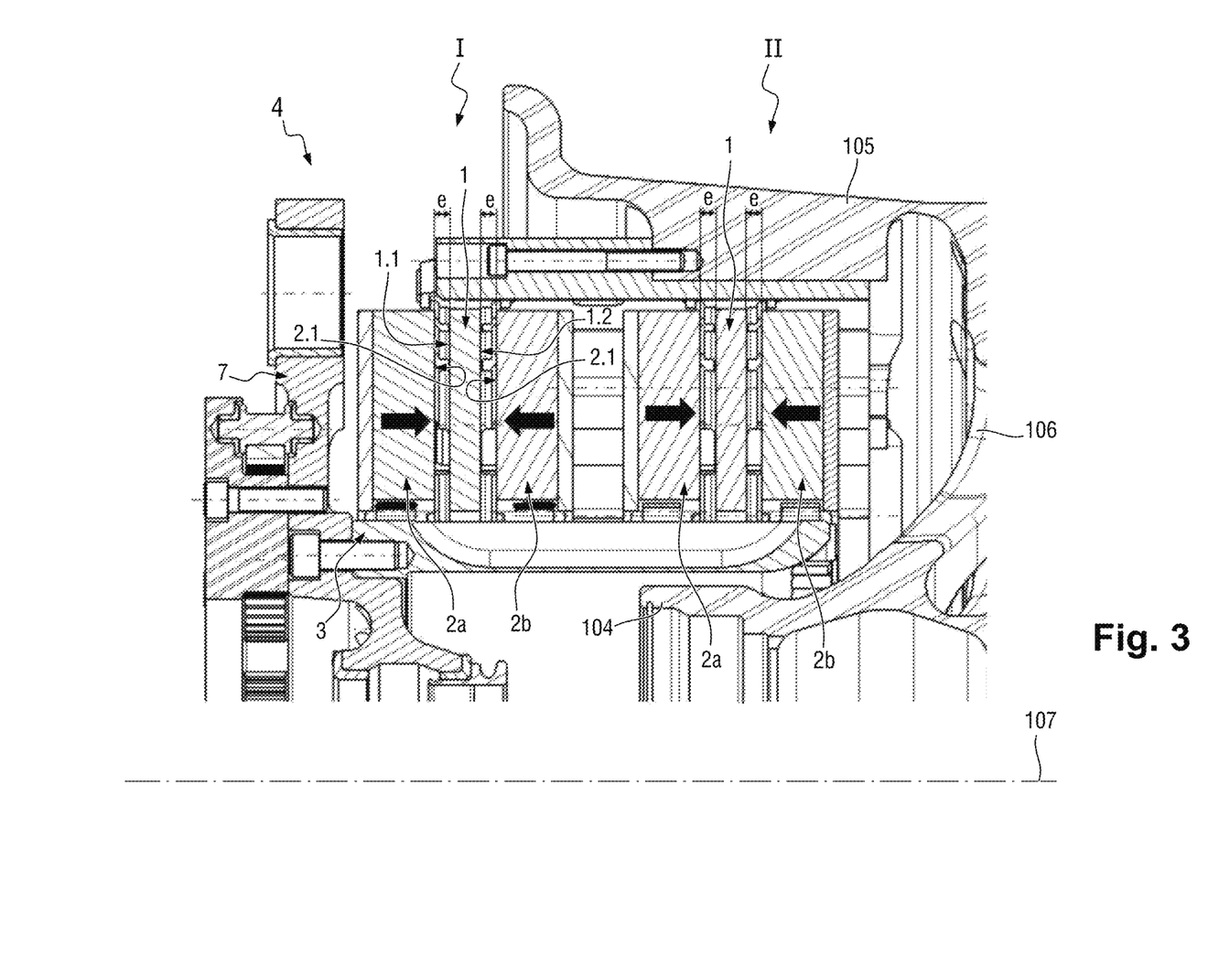
FIG. 3 is a partial schematic view of a wheel according to a first embodiment of the actuator of the invention, as a cross-section along the plane III of FIG. 2.
Figure 4:
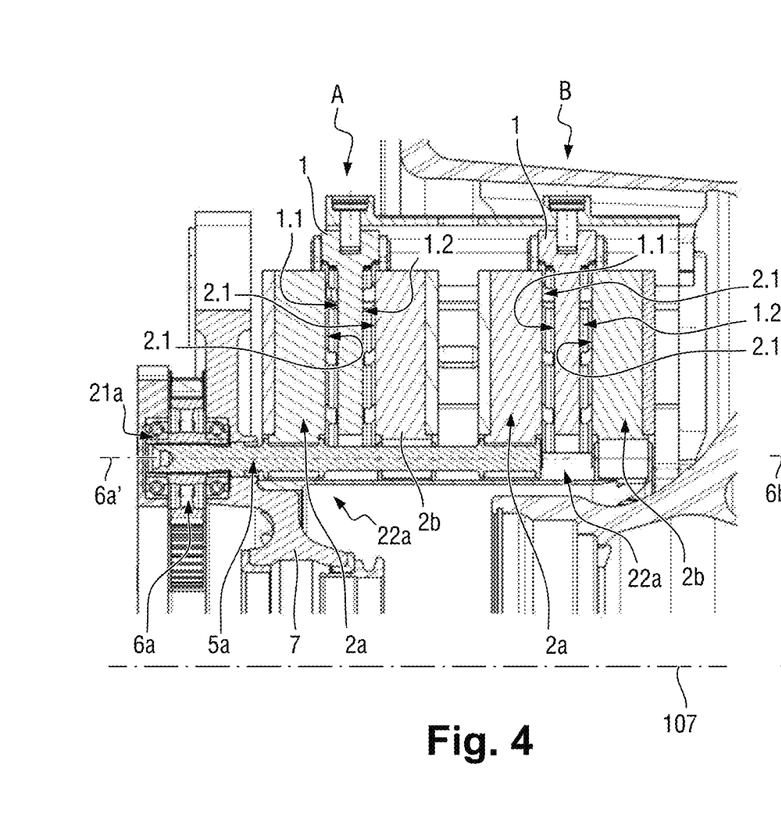
FIG. 4 is a partial schematic view of a wheel according to the first embodiment of the invention, as a cross-section along the plane IV of FIG. 2.
Figure 5:
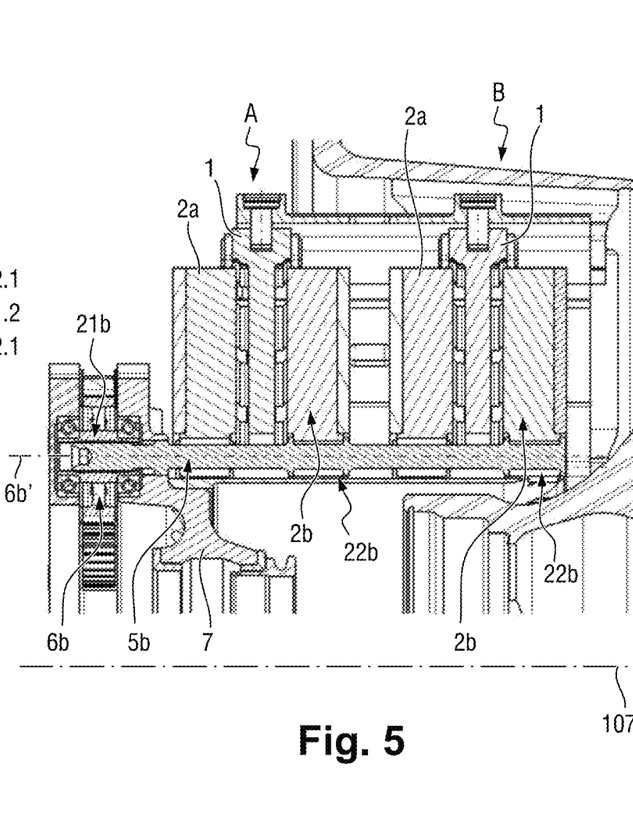
FIG. 5 is a partial schematic view of a wheel according to the first embodiment of the invention, as a cross-section along the plane V of FIG. 2.
Figure 6:
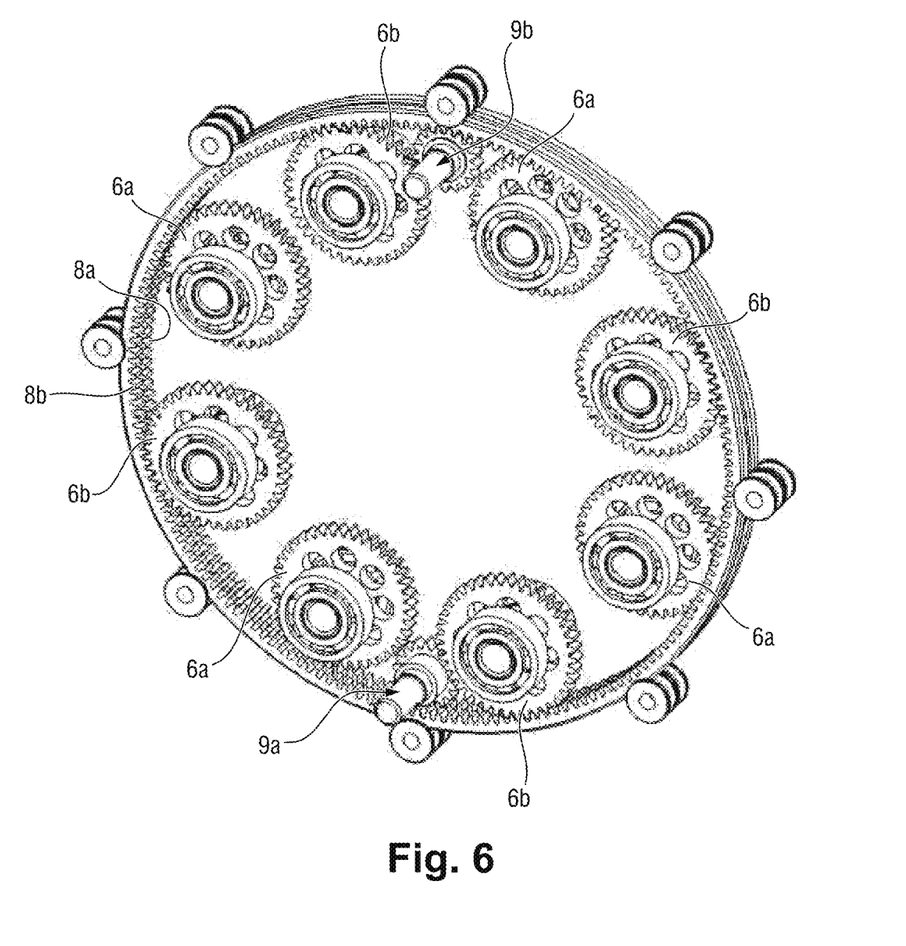
FIG. 6 is a perspective view of the motor crown and pinions of the transmission assemblies according to a first variant of the first embodiment.
Figure 7:
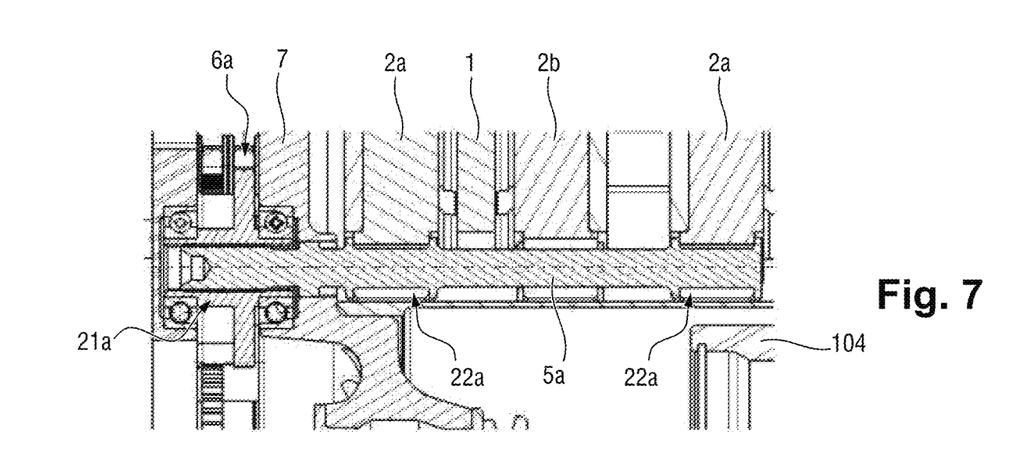
FIG. 7 is a view similar to that of FIG. 4 of the wheel according to this embodiment variant.
Figure 8:
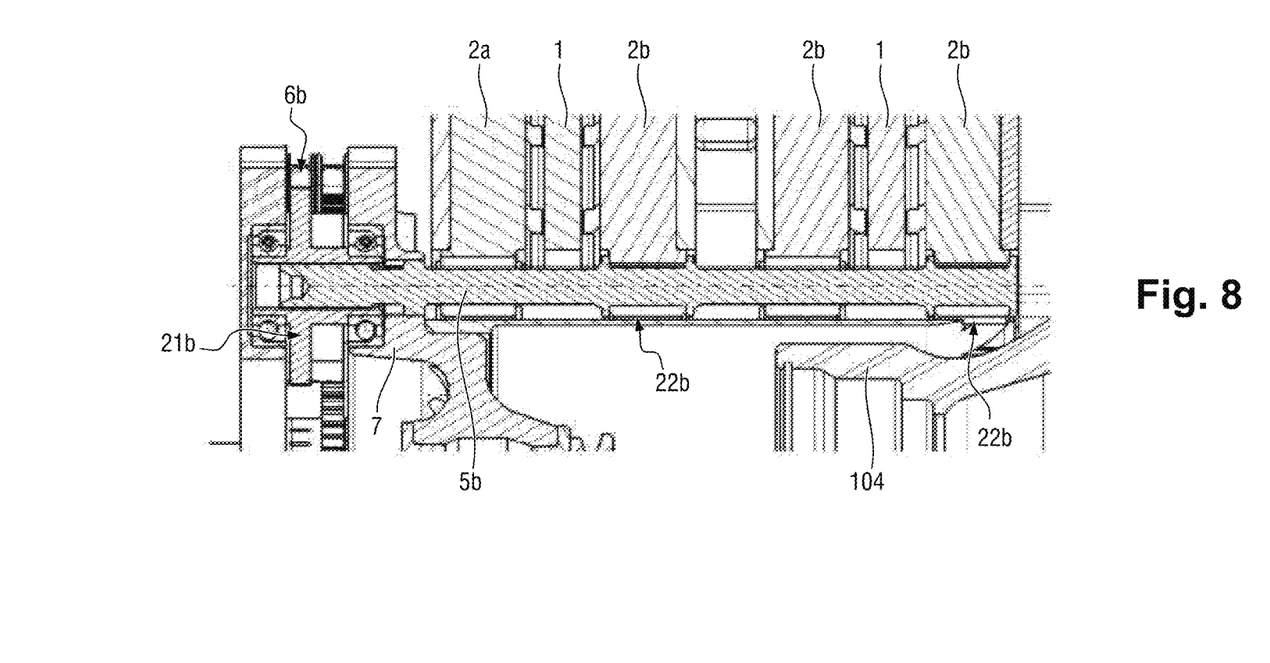
FIG. 8 is a view similar to that of FIG. 5 of the wheel according to this embodiment variant.

In the variant of FIGS. 6 to 8, the pinions 6*a* are connected to the operating bars 5*a* by a helical connection in the same direction as that connecting the pinions 6*b* to the operating bars 5*b*.

The pinions 6*a* mesh with the inner gearing of a crown 8*a* rotated by a pinion 9*a*, while the pinions 6*b* mesh with the inner gearing of a crown 8*b* rotated by a pinion 9*b*. The crown 8*b* is superposed to the crown 8*a* which is the crown closest to the braking sets A, B. The pinions 8*a* are therefore closer to the stators 2*a* than the pinions 8*b*.

It is understood that, in this variant, the motor pinions 9*a*, 9*b* drive the crowns 8*a*, 8*b* in first opposite directions to respectively move each stator 2*a* closer to the rotor 1, and each stator 2*b* closer to the rotor 1 and in second opposite directions, to respectively move each stator 2*a* away from the rotor 1, and each stator 2*b* away from the rotor 1.

Figure 9:
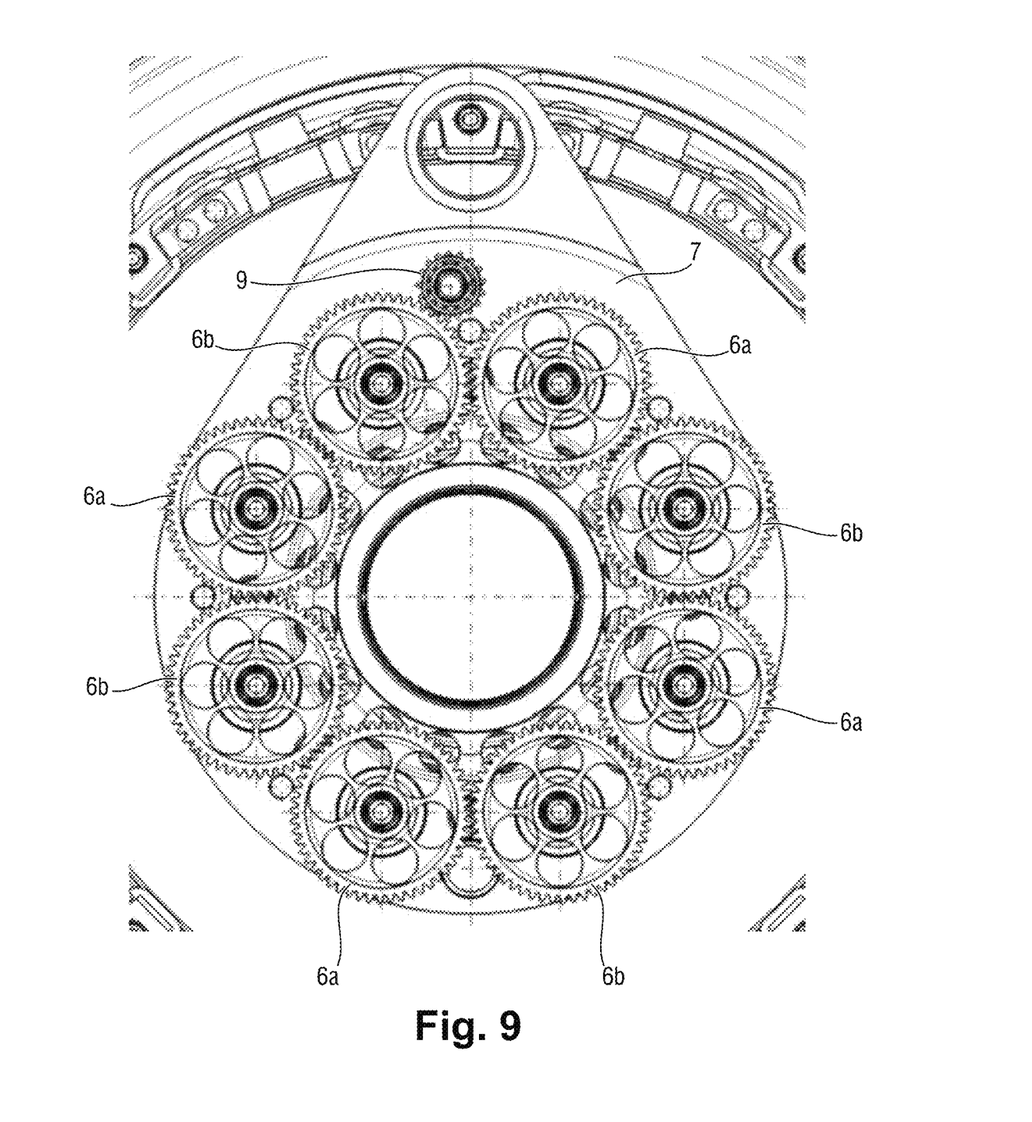
FIG. 9 is a partial front view of the wheel showing the pinions of the transmission assemblies according to a second variant of the first embodiment.

In the variant of FIG. 9, the crown 8 is removed. The adjacent pinions 6*a*, 6*b* mesh with one another in pairs. A motor pinion 9 meshes with one of the pinions 6*b*, such that the movement that the motor pinion 9 communicates to said one of the pinions 6*b* is communicated closer in series to the other pinions 6*a*, 6*b*. As a pinion 6*b* is disposed between each pair of pinions 6*a*, all the pinions 6*b* rotate in the same direction which is opposite the direction in which the pinions 6*a* rotate.

Thus, in a first direction of rotation of the motor pinion 9, the pinions 6*a*, 6*b* move the operating bars 5*a*, 5*b* to respectively move each stator 2*a* closer to the rotor 1 and each stator 2*b* closer to the rotor 1*b* and, in a second direction of rotation of the motor pinion 9, the pinions 6*a*, 6*b* move the operating bars 5*a*, 5*b* to move each stator 2*a* away from the rotor 1 and each stator 2*b* away from the rotor 1.

Figure 10:
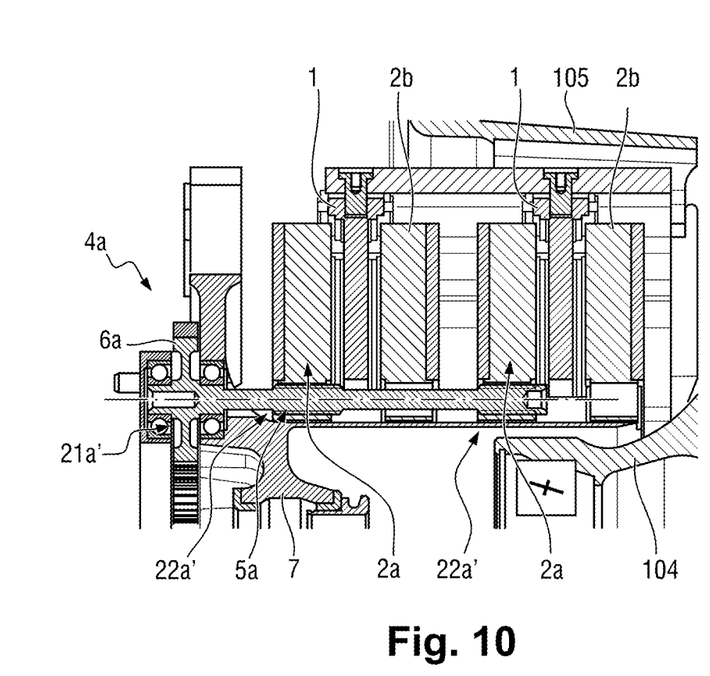
FIG. 10 is a view similar to that of FIG. 4 of the wheel according to a second embodiment of the actuator of the invention.
Figure 11:
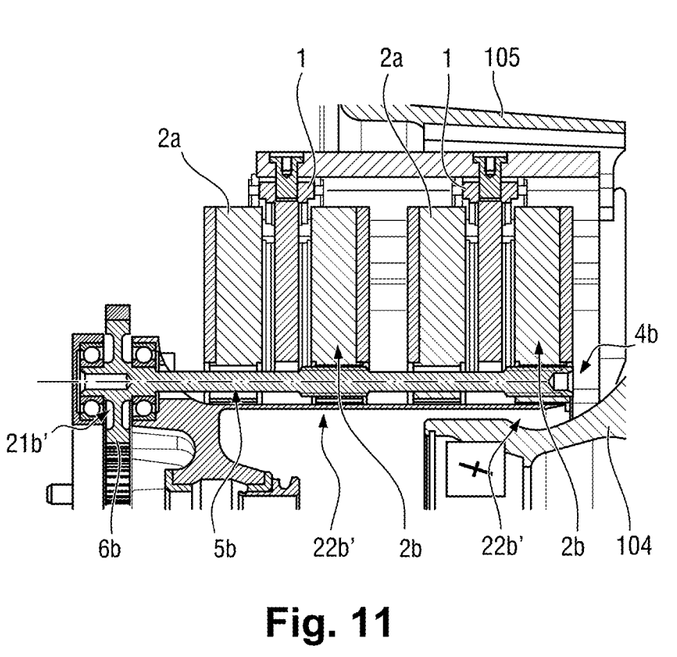
FIG. 11 is a view similar to that of FIG. 5 of the wheel according to the second embodiment.

The elements identical or similar to those described above will have the same numerical reference as the latter in the description below of the second embodiment of the actuator in relation to FIGS. 10 and 11.

In the second embodiment of the actuator 4, the actuator 4 comprises, as above, a plurality of transmission assemblies generally referenced as 4*a* to move the stators 2*a* and a plurality of transmission assemblies generally referenced as 4*b* to move the stators 2*b*. The transmission assemblies 4*a* are disposed alternately with respect to the transmission assemblies 4*b*.

Each transmission assembly 4*a* comprises an operating bar 5*a* mounted on the torque tube 3 to extend parallel to the primary rotational axis 107 and pivot without sliding about said axis.

The operating bar 5*a* is connected by a first mechanical connecting member 21*a*' to a pinion 6*a* mounted in the actuator carrier plate 7 by bearings to be stationary in translation and rotatably movable about a secondary rotational axis 6*a*' colinear to the longitudinal axis of the operating bar 5*a*. The first mechanical connecting member 21*a*' ensures a flush-mounting connection of the end of the operating bar 5*a* in the pinion 6*a*. The first mechanical connecting member 21*a*' can be a welding, adhesive, an interlocking, a clamped adjustment, a bolt, a pin, etc. In this case, the operating bar 5*a*, the first mechanical connecting member 21*a*' and the pinion 6*a* are made of one single part. Thus, a rotation of the pinion 6*a* causes a rotation of the operating bar 5*a* in one direction or in the other, in the direction of rotation of the pinion 6*a*. The pinions 6*a* mesh with an internal gearing of a crown which is centred on the primary rotational axis 107 and which surrounds the pinions 6*a*. This crown is identical to the crown 8 and is mounted and rotated like the latter.

The operating bar 5*a* is connected by a second mechanical connecting member 22*a*' to each stator 2*a*. Each second mechanical connecting member 22*a*' comprises a mesh extending around the operating bar 5*a* and engaging with a tapping provided in the internal circumference of the stator 2*a*. The two second mechanical connecting members 22*a*' ensure a helical connection between the operating bar 5*a* and the stators 2*a*.

Each transmission assembly 4*b* comprises an operating bar 5*b* mounted on the torque tube 3 to extend parallel to the primary rotational axis 107 and pivot without sliding about said axis.

The operating bar 5*b* is connected by a first mechanical connecting member 21*b*' to a pinion 6*b* mounted in the actuator carrier plate 7 by bearings to be stationary in translation and rotatably movable about a secondary rotational axis 6*b*' colinear to the longitudinal axis of the operating bar 5*b*. The first mechanical connecting member 21*b*' ensures a flush-mounting connection of the end of the operating bar 5*b* in the pinion 6*b*. The first mechanical connecting member can be a welding, an adhesion, an interlocking, a clamped adjustment, a bolt, a pin, etc. In this case, the operating bar 5*b* is made of one single part with the pinion 6*b*. Thus, a rotation of the pinion 6*b* causes a rotation of the operating bar 5*b* in one direction or in the other, according to the direction of rotation of the pinion 6*b*. The pinions 6*b* mesh with an internal gearing of the abovementioned crown which surrounds the pinions 6*a*.

The operating bar 5*b* is connected by a second mechanical connecting member 22*b*' to each stator 2*b*. Each second mechanical connecting member 22*b*' comprises a mesh extending around the operating bar 5*b* and engaging with a tapping provided in the internal circumference of the stator 2*b*. The two second mechanical connecting members 22*b*' ensure a helical connection between the operating bar 5*a* and the stators 2*b*.

The helical connections formed between the stators 2*b* and each operating bar 5*b* are of opposite direction to the helical connection formed between the stators 2*a* and each operating bar 5*a*. It is therefore understood that when the crown rotates in one direction, it drives the pinions 6*a*, 6*b* and the operating bars 5a, 5b in the same direction; however, the stators 2a are moved in a direction opposite the direction of movement of the stators 2b. A rotation of the crown in a first direction therefore causes the stators 2a to move closer to the stators 2b respectively (the air gap with the rotors 1 decreases), while a rotation of the crown in a second direction causes the stators 2a to move away from the stators 2b respectively (the air gap with the rotors 1 increases).

Naturally, the invention is not limited to the described embodiments, but cover any variant coming within the scope of the invention such as defined by the claims.

In particular, the device can have a structure different from that described.

The magnets can be carried by the rotor instead of the stator, two rotors flanking a stator.

The shape, the arrangement and the dimensions of the magnets can be different from those described. For example, and according to the third embodiment represented in FIG. 14, the magnets 11, 12, 13, 14 all have the same dimensions. Preferably, the first magnets 11, 13 will represent around 70% of the surface of the element which carries them, but this is not compulsory.

It is advantageous, but not compulsory, to have an arrangement of magnets according to which the plurality of magnets comprises first magnets 11, 13 and second magnets 12, 14 disposed alternately, the first magnets 11, 13 having a first magnetisation vector substantially perpendicular to the surfaces opposite 1.1, 1.2, 2.1, and each of the second magnets 12, 14 having a second magnetisation vector substantially perpendicular to the first magnetisation vectors of the first two magnets between which it is located; and the magnets 11, 12, 13, 14 have widths, such that the first magnets 11, 13 are spaced apart in pairs by a first distance less than a second distance separating the second magnets 12, 14 in pairs.

The use of a Halbach array is not compulsory.

The number of rotors and/or the number of stators can be different from those mentioned.

Although the rotor and the stator have been described in the form of parallel discs and opposite one another, the stator and the rotor can have other forms. The device described has an axial flux, but the invention is applicable to a radial flux operation. Thus, the triplet can, for example, be arranged in the form of an external drum and an internal drum between which a central drum extends, such that the central drum has an outer surface opposite an inner surface of the external drum and an inner surface opposite an outer surface of the internal drum. The magnets are carried by the outer surface of the internal drum and by the inner surface of the external drum.

The magnetic braking device according to the invention can be associated with a conventional friction braking device, which comprises friction members, for example a stack of carbon discs, and a plurality of electromechanical actuators carried by an actuator carrier. Each electromechanical actuator comprises an electric motor and a pushbutton capable of being moved by the electric motor to press the stack of discs. The electromechanical actuator is thus intended to produce a controlled braking force on the stack of discs. A mode for controlling the braking devices is, for example, known from document FR-A-2953196.

In a variant, the magnets can be directly fixed on the stator discs of the friction brake, or the magnets can be covered by a friction trim, such that the braking device ensures a magnetic braking to slow down the wheel when the discs are moved away from one another by a suitable air gap and a braking by friction, when the discs are applied against one another. Therefore, there is no longer an axial abutment between the discs in this embodiment.

In the second embodiment, it is possible to have, on one same operating bar, helical connections of opposite directions, for example, by returning threaded inserts onto the operating bar externally. One same operating bar can thus move the two stators by one same set.

The invention can be used on any type of vehicle.

The invention claimed is:

1. A wheel comprising a rim mounted to rotate on a support comprising:
    a shaft defining a primary rotational axis, and
    an eddy current magnetic braking device comprising at least one first braking set comprising a first stator and a second stator which are connected to the support and a rotor connected to the rim and disposed between the stators, such that each stator has a first face opposite a face of the rotor and separated from said face by an air gap, the rotor being made of electrically conductive material and the stators carrying a plurality of magnets emitting via the first face, a magnetic flux capable of causing, in accordance with the air gap, eddy currents in the rotor when the rotor pivots with the wheel,
    wherein the eddy current magnetic braking device comprising comprises an actuator which comprises at least one first transmission assembly and one second transmission assembly each comprising a pinion mounted on the support to pivot about a secondary rotational axis parallel to the primary axis, an operating bar extending about the secondary axis, a first mechanical connecting member connecting the operating bar to the pinion of the transmission assembly in question and at least one second mechanical connecting member connecting the operating bar to one of the stators; and in that the mechanical connecting members are arranged, such that the rotation of the pinions causes a movement of the stators parallel to the secondary axis in opposite directions, for varying the air gap, at least one of the mechanical connecting members of each transmission assembly being arranged to ensure a screw-nut helical connection.

2. The wheel according to claim 1, wherein the first transmission assembly is linked to the first stator and the second transmission assembly is linked to the second stator; the operating bar of each transmission assembly is mounted on the support to be rotatably stationary and to slide about the secondary axis, the first mechanical connecting member ensures the helical connection and the second mechanical connecting member is arranged to link the operating bar and the stator in question in translation about the secondary axis, such that the rotation of the pinion of each transmission assembly causes the translation of the operating bar and of the stator in question about the secondary axis, the helical connection of the first transmission assembly and the helical connection of the second transmission assembly having opposite directions.

3. The wheel according to claim 2, wherein the second mechanical connecting member comprises two abutments integral with the operating bar and flanking a portion of the stator in question to drive the stator related with the operating bar.

4. The wheel according to claim 2, comprising two braking sets, each comprising a first stator and a second stator flanking the rotor; wherein the first transmission assembly comprises two second mechanical connecting members connecting the operating bar to the two first stators and the second transmission assembly comprises two second mechanical connecting members connecting the operating bar to the two second stators.

5. The wheel according to claim 1, wherein the operating bars are mounted on the support to be stationary in translation and rotatably free about the secondary axis, the first mechanical connecting member is arranged to rotatably connect the pinion and the operating bar of the transmission assembly related and the second mechanical connecting member of each operating bar of each transmission assembly ensures the helical connection with the stator, such that the rotation of the pinion and of the operating bar of each transmission assembly drives a translation of the stator about the secondary axis, the helical connection of the first stator and the helical connection of the second stator having opposite directions.

6. The wheel according to claim 5, wherein the first mechanical connecting member of each transmission assembly comprises a flush-mounting of the pinion on the operating bar of the transmission assembly related.

7. The wheel according to claim 5, comprising two braking sets each comprising a first stator and a second stator-flanking the rotor; wherein each transmission assembly comprises two mechanical connecting members connecting the operating bar to the two first stators and to the two second stators.

8. The wheel according to claim 1, wherein the eddy current magnetic braking device comprises a common drive crown having an inner gearing meshing with the pinion of each transmission assembly.

9. The wheel according to claim 8, wherein at least one drive pinion is rotatably mounted on the support to mesh with the inner gearing of the drive motor crown.

10. The wheel according to claim 1, wherein the eddy current magnetic braking device comprises two common drive crowns, coaxial to one another, one meshing with the pinion of the first transmission assemblies and the other meshing with the pinion of the second transmission assemblies.

11. The wheel according to claim 1, wherein the eddy current magnetic braking device comprises a drive pinion meshing with the pinion of the second transmission assembly which itself meshes with the pinion of the first transmission assembly.

12. The wheel according to claim 1, wherein the magnets are disposed, such that the stators are mutually attracted.

13. The wheel according to claim 12, wherein the rotor has a thickness, such that a skin effect is caused from each face of the rotor over more than half of the thickness of the rotor at least over a range of possible relative speeds of the rotor with respect to the stators.

14. A landing gear comprising a strut having an end carrying a shaft on which is mounted the hub of at least one of the wheel according to claim 1.

15. An aircraft provided with at least one of the landing gear according to claim 14.

\* \* \* \* \*